(12) United States Patent
Smith et al.

(10) Patent No.: US 7,329,309 B2
(45) Date of Patent: Feb. 12, 2008

(54) GAS-SOLIDS SEPARATION DEVICE AND METHOD

(75) Inventors: Jeffrey S. Smith, Texas City, TX (US); James H. Beech, Jr., Kingwood, TX (US); Nicolas P. Coute, Houston, TX (US); Jesse F. Goellner, Houston, TX (US); Kenneth Ray Clem, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 361 days.

(21) Appl. No.: 11/134,913

(22) Filed: May 23, 2005

(65) Prior Publication Data

US 2006/0130444 A1 Jun. 22, 2006

Related U.S. Application Data

(60) Provisional application No. 60/639,067, filed on Dec. 22, 2004.

(51) Int. Cl.
*B01D 45/01* (2006.01)
(52) U.S. Cl. ............................. 95/271; 55/345; 55/349; 95/271
(58) Field of Classification Search .................. 95/271; 55/345, 349
See application file for complete search history.

(56) References Cited

U.S. PATENT DOCUMENTS

| | | | | |
|---|---|---|---|---|
| 3,885,933 | A | | 5/1975 | Putney ........................ 55/397 |
| 4,546,709 | A | | 10/1985 | Åström ...................... 110/216 |
| 5,286,281 | A | * | 2/1994 | Bartholic ...................... 95/271 |
| 5,665,949 | A | * | 9/1997 | Fusco et al. ................. 208/161 |
| 6,533,844 | B1 | | 3/2003 | Hiltunen et al. .............. 95/271 |
| 6,858,130 | B2 | * | 2/2005 | Hiltunen ..................... 208/161 |
| 2002/0033098 | A1 | * | 3/2002 | Hiltunen ...................... 95/269 |

FOREIGN PATENT DOCUMENTS

| | | |
|---|---|---|
| GB | 1401331 | 7/1975 |
| WO | WO 99/25469 | 5/1999 |

OTHER PUBLICATIONS

Hoffman et al, "Gas Cyclones and Swirl Tubes: Principles, Design and Operation", Germany 2002, pp. 42-44.
Shepherd et al, "Cyclones", Air Pollution Control; A Design Approach, 2nd Edition, Waveland (Illinois) 1994, pp. 127-150.

* cited by examiner

*Primary Examiner*—Duane Smith
*Assistant Examiner*—Sonji Turner

(57) ABSTRACT

A multi-stage gas-solids separator is configured so that the higher density (solids) output flows of two or more of the separator stages are merged together. The multi-stage separator is preferably composed of cyclone separators, with the diplegs of at least two of the cyclone separator stages merged together.

12 Claims, 3 Drawing Sheets

GAS-SOLIDS SEPARATION DEVICE AND METHOD

CROSS REFERENCE TO RELATED APPLICATIONS

This application claims the benefit of Provisional Application No. 60/639,067 filed Dec. 22, 2004, the disclosure of which is fully incorporated herein by reference.

FIELD OF THE INVENTION

This invention is directed to an apparatus and method for separating solid catalyst particles from a gas-solids flow.

BACKGROUND OF THE INVENTION

Fluid-solid reaction systems, such as gas-solids reaction systems, often require the solids to be retained in early stages of the reaction system while the vapor product, essentially free of solids, is processed in downstream equipment. It is desirable in these systems that the solids be as completely removed as possible from the vapor before transferring the vapor to the downstream equipment. High solids retention in the early stages of the reaction system is desirable in cases in which the solids may contaminate the vapor product or downstream vapor process handling systems, and/or increase the capital and operating costs of downstream particulate capture devices such as wet gas scrubbers, electrostatic precipitators, or filters. Additionally, in reaction systems that use small particle catalysts, the loss of catalyst particles during operation means that additional catalyst has to be added during operation to make up for the catalyst loss. Particularly in cases where the cost of catalyst is high, even marginal improvements in solid particle retention can lead to substantial reductions in operating costs. Therefore, improvements in high efficiency solids/vapor separation systems are of particular interest.

One method for separating solids from a gas-solids flow is to pass the gas-solids flow through one or more cyclone separators. For example, cyclone separators are conventionally used to separate particles from gas-solids flows in fluidized bed reactor systems such as FCC reactors and oxygenate-to-olefin reactors. In these systems, cyclone separators can be arranged in "stages" so that the lower density or gas output of a first cyclone separator stage becomes the input for a second cyclone separator stage.

Although the cyclone separators can be arranged in stages to improve efficiency, in practice the number of stages is limited by constraints on the input and output flows of the cyclones. Once the majority of solids have been removed from a gas flow, the remaining solids in the flow may not be sufficient to allow a conventional cyclone separator to operate at full efficiency. In particular, it is difficult to design a multistage cyclone separator, as the amount of solids in the input flow for any cyclone stages after the first cyclone stage is often too low for fully efficient operation of a conventional cyclone. Due to the low rate of solid catalyst particle flow, in multistage cyclone separators the diameter of the final cyclone stage dipleg can often be ½ inch or less. At such a dipleg diameter, the dipleg is prone to catalyst bridging or compaction. Catalyst bridging and/or compaction prevents outflow of catalyst from the cyclone stage and therefore causes poor separation efficiency. However, if a larger dipleg diameter is used, the low rate of solid catalyst flow may not be sufficient to seal the dipleg. If the dipleg does not seal properly, gas can flow back into the cyclone through the dipleg, which also reduces the separation efficiency.

U.S. Pat. No. 6,533,844 to Hiltunen et al. describes a two-stage cyclone separator for use in fluidized bed reactor systems. In Hiltunen et al., the first and second cyclone separator stages are arranged concentrically so that the second cyclone separator stage is contained within the first cyclone separator stage. Based on this configuration, the first cyclone has a roughly annular processing volume. Similarly, the dipleg (higher density output) of the first cyclone has a roughly annular volume. The low density or gas output of the first cyclone is fed into the second, inner cyclone as an input flow through one or more ports in the second cyclone. The concentric arrangement of cyclones reduces the space required to house the cyclones. However, the fluid and particle transport between the cyclones is otherwise similar to conventional multistage cyclone arrangements.

What is needed is an improved process and/or apparatus for removing solid particles in gas-solids reactors, such as in reaction systems that use molecular sieve type catalysts. Preferred processes would include those that provide for a higher retention rate of solid particles, including particles of less than 50 μm in size, and those that have minimal or no impact on the efficiency of the reaction being carried out in the reactor.

SUMMARY OF THE INVENTION

The invention provides a method and apparatus for improving the separation of solid particles from gas-solids flows. In an embodiment, this is achieved by an apparatus comprising a plurality of separator stages arranged in series, wherein each separator stage has an input conduit, a high density output conduit, and a low density output conduit. The separator stages are connected so that the output from the low density output conduit of an earlier separator stage is fed into the input conduit of a subsequent separator stage. Additionally, the high density output conduit of the earlier separator stage is merged with the high density output conduit of the subsequent separator stage. Preferably, a flapper valve or another type of valve controls the flow between the merged high density output conduits. In an alternative embodiment, the high density output conduit of two or more separator stages can be merged together.

In another embodiment, the invention provides a method separating solid particles from a gas-solids flow. A gas-solids flow is first separated into a first flow having a higher density and second flow having a lower density. The second flow is then fed into a separator, where the second flow is split again into a third flow having a higher density and a fourth flow having a lower density. The first flow and third flow are then merged, and the merged flow is directed to a location for receiving solids separated from the gas-solids flow.

BRIEF DESCRIPTION OF THE DRAWINGS

Various embodiments of the invention are also described in the accompanying drawings, wherein.

DETAILED DESCRIPTION OF THE INVENTION

I. Overview

Figure 1:
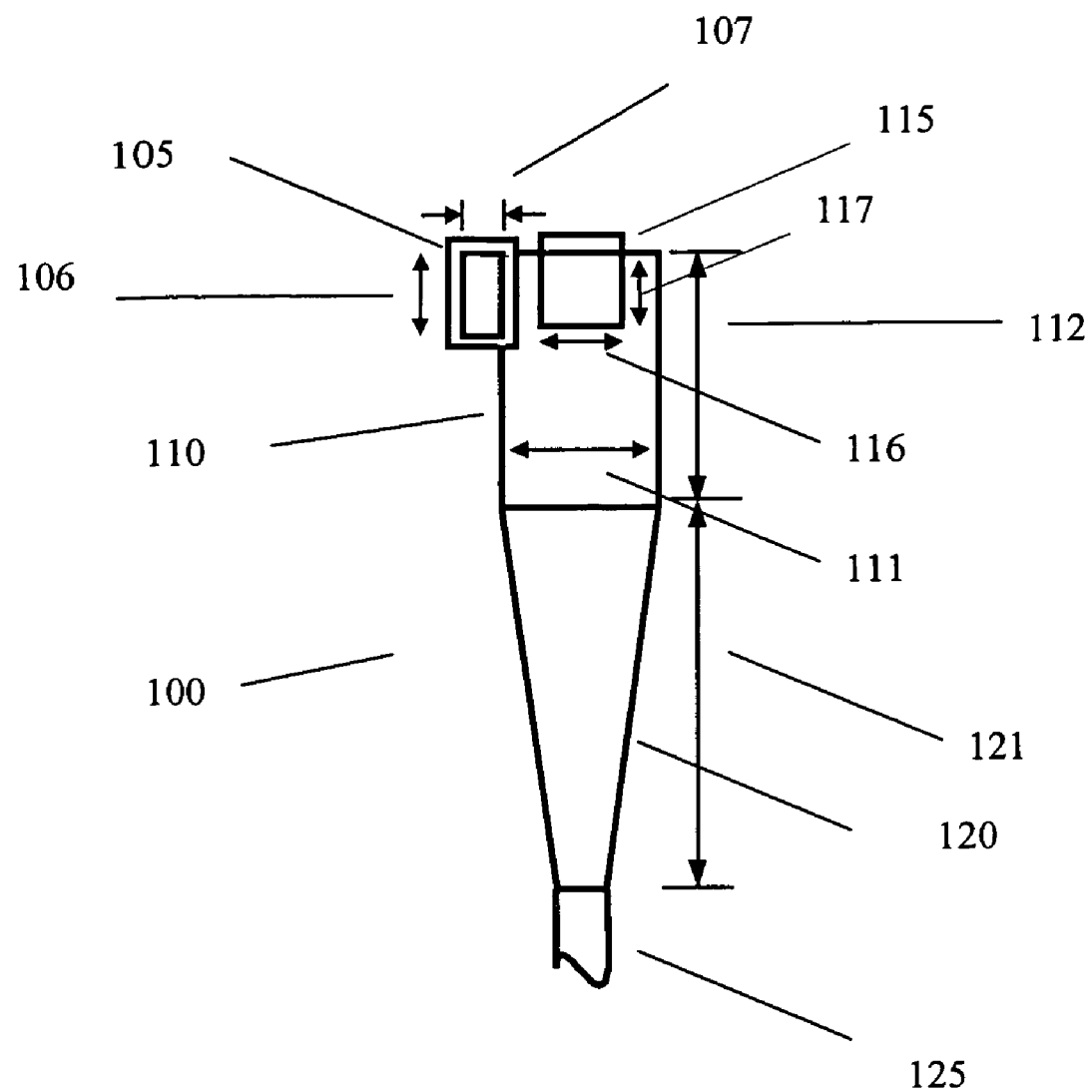
FIG. 1 depicts a simplified schematic of a cyclone separator according to an embodiment of the invention.

This invention provides a method and apparatus for removing solids particles from a gas-solids reaction system. In particular, the process and apparatus of the invention provide improved solid particle recovery via a novel configuration and method for operating sequential cyclone separator stages.

In an embodiment, the invention provides a multistage cyclone separator, where the dipleg output flows of two or more cyclones are merged together into a single output flow. This single output flow then continues to the dust pot, particle bed, or any other part of a reaction system suitable for receiving an output flow of solid particles from a cyclone separator. Combining the dipleg output flows of two or more cyclones into a single output flow allows multiple cyclone stages to operate with high efficiency when the input flows of one or more the stages have a relatively low solids content. This embodiment also reduces the likelihood of a dipleg becoming plugged or jammed or compacted when operating a cyclone stage with a low solids content inlet flow.

In another embodiment, the invention improves particle separation for gas solids flows used in reaction systems such as FCC reactors. In conventional FCC reactors, a two-stage cyclone separator can be used to remove the majority of catalyst particles from a gas-solids flow. However, the gas flow will still contain solid particles, including a high proportion of "fines," or particles with an average diameter of less than 50 μm. In various types of fluidized bed reactors, the presence of fines improves the operation of the fluidized bed. Thus, it is desirable to use a third cyclone separator stage in order to further separate the fines and other remaining particles from the gas flow and return the fines back to the reaction system. By configuring a three-stage cyclone separator according to an embodiment of this invention, improved performance of the third cyclone separator stage can be achieved, allowing for improved fines retention. Improved fines retention can be beneficial, for example, in reducing the gas bubble size within a bed of catalyst particles and in improving gas distribution within a bed. The reduction in gas bubble size and improved gas distribution can also lead to smoother catalyst flow within a reaction system.

II. Operation of a Cyclone Separator

During operation a cyclone separator stage receives at least one input flow via one or more input conduits. The cyclone separator stage produces a lower density (gas) flow that conventionally exits from an output conduit near the top of the separator stage. The cyclone separator stage also produces a higher density (solids) flow that exits through the dipleg of the separator or another high density output conduit. Note that the lower density flow exiting a cyclone is still typically a gas-solids flow, as some solid particles typically remain in the lower density flow.

Preferably, a cyclone separator is operated to maintain a minimum solid particle flux (or mass flux) in the output flow exiting through the dipleg of the separator. For the cyclone to operate properly, the flow through the dipleg should be enough to "seal" the dipleg and prevent gas flow back up through the dipleg into the cyclone. In other words, the catalyst particle flow exiting the dipleg must be enough to prevent gas from flowing up from the catalyst bed (or other location that receives the separated catalyst particles), through the dipleg, and back into the barrel of the cyclone due to pressure differential. However, the diameter and length of the dipleg must also be large enough so that catalyst particles can exit the dipleg. Otherwise, the catalyst particles can build up a catalyst level in the dipleg that reaches back into the cyclone barrel. In an embodiment, the solid particle flux through the dipleg of a cyclone is at least 25 $lb/ft^2*sec$, or at least 50 $lb/ft^2*sec$, or at least 75 $lb/ft^2*sec$. In another embodiment, the solid particle flux through the dipleg of the cyclone does not exceed 150 $lb/ft^2*sec$.

The solid particle flux exiting through the dipleg of the cyclone is influenced by the size of the dipleg. If the same total mass flow is passed through two diplegs, the dipleg having the larger diameter will have a correspondingly lower flow velocity through the dipleg. Thus, if the amount of mass flow that will be exiting a cyclone is known, the dipleg diameter can be selected so that a preferred dipleg output solid particle flux is achieved. However, if the dipleg is too small, the dipleg may be prone to catalyst bridging or jamming. As a result, diplegs with a diameter of at least 2" are preferred, diplegs with a diameter of at least 4" are more preferred, and diplegs with a diameter of at least 6" are even more preferred.

FIG. 1 schematically depicts an individual cyclone separator stage suitable for use in an embodiment of the invention. The cyclone 100 schematically shown in FIG. 1 includes a cyclone inlet 105, a cyclone barrel 110, an outlet pipe 115, and a cyclone cone 120 leading to a dipleg 125.

In an embodiment, the cyclone barrel 110 can have a diameter 111 of from about 1 foot to about 9 feet. In various embodiments, the diameter of the cyclone barrel can be 2 feet or greater, or 3 feet or greater, or 4 feet or greater, or 6 feet or greater, or 8 feet or greater. In corresponding embodiments, the diameter of the cyclone barrel can be 3 feet or less, or 4 feet or less, or 6 feet or less, or 8 feet or less, or 9 feet or less.

The height 112 of cyclone barrel 110 can be from about 3 feet to about 30 feet. In various embodiments, the height of the cyclone barrel can be 3 feet or greater, or 5 feet or greater, or 10 feet or greater, or 15 feet or greater, or 20 feet or greater. Alternatively, the height of the cyclone barrel can be 10 feet or less, or 15 feet or less, or 20 feet or less, or 25 feet or less, or 30 feet or less.

The height 106 of cyclone inlet 105 can be from about 2 feet to about 6 feet. In various embodiments, the height of the cyclone inlet can be 2 feet or greater, or 3 feet or greater, or 4 feet or greater, or 5 feet or greater. Alternatively, the height of the cyclone inlet can be 3 feet or less, or 4 feet or less, or 5 feet or less, or 6 feet or less.

The width 107 of cyclone inlet 105 can be the same as the height 106 to produce a symmetric (square or circular) inlet, or the width can be from about 1 foot to about 4 feet. In various embodiments, the width of the cyclone inlet can be 1 foot or greater, 2 feet or greater, or 3 feet or greater. Alternatively the width of the cyclone inlet can be 2 feet or less, or 3 feet or less, or 4 feet or less.

The diameter 116 of outlet pipe 115 can be from about 1 foot to about 4 feet. In various embodiments, the diameter of the outlet pipe can be 1 foot or greater, 1.5 feet or greater, 2 feet or greater, 2.5 feet or greater, 3 feet or greater, or 3.5 feet or greater. Alternatively, the diameter of the outlet pipe can be 1.5 feet or less, 2 feet or less, 2.5 feet or less, 3 feet or less, 3.5 feet or less, or 4 feet or less.

The length 117 that outlet pipe 115 extends into barrel 110 can be from about 2 feet to about 5 feet. In various embodiments, the length that the outlet pipe extends into the barrel can be 2 feet or greater, 3 feet or greater, or 4 feet or greater. Alternatively, the length that the outlet pipe extends into the barrel can be 3 feet or less, 4 feet or less, or 5 feet or less.

The height 121 of cyclone cone 120 can be from about 5 feet to about 50 feet. In various embodiments, the height of the cyclone cone can be 5 feet or greater, 10 feet or greater, 20 feet or greater, or 30 feet or greater. Alternatively, the height of the cyclone cone can be 15 feet or less, 25 feet or less, 35 feet or less, or 50 feet or less.

The diameter of dipleg 125 can be from about 0.15 feet to about 5 feet. In various embodiments, the diameter of the dipleg can be 0.15 feet or greater, or 0.33 feet or greater, or 0.5 feet or greater, or 1 foot or greater, or 1.5 feet or greater, or 2 feet or greater, or 2.5 feet or greater, or 3 feet or greater, or 3.5 feet or greater, or 4 feet or greater. Alternatively, the diameter can be 1 foot or less, or 1.5 feet or less, or 2 feet or less, or 2.5 feet or less, or 3 feet or less, or 3.5 feet or less, or 4 feet or less, or 4.5 feet or less, or 5 feet or less.

III. Multi-Stage Cyclones with Merged Diplegs

The efficiency of a cyclone separator for removing particles in a gas-solids flow is believed to depend on the size of the particles. One model for describing the particle removal efficiency of a properly operating cyclone separator is the Lapple Grade Efficiency Curve. Models for cyclone efficiency such as the Lapple Grade Efficiency Curve typically show a dependence on the size of particle being removed, with smaller particles being removed less efficiently. To improve the separation efficiency of solid particles from a gas-solids flow, multiple cyclones in series can be arranged in stages.

When multiple cyclones are arranged in stages, the lower density flow of one stage is conventionally directed into the input of a following or subsequent cyclone stage. The coupling between consecutive cyclone stages can be any conventional type of open or close coupling. The higher density flows of each cyclone stage are conventionally directed to a suitable location for receiving solids separated from the initial gas-solids flow. For example, in a fluidized bed reactor, the particles contained in the higher density flow can be routed back into the fluidized bed.

As a gas-solids flow passes through a multi-stage cyclone separator, each stage will remove a portion of the solids from the flow. As a result, in an embodiment where the gas solids flow has passed through at least one stage or at least two stages, the lower density flow may only have an output flow rate of catalyst particles of 50 lb/hr, or 75 lb/hr, or 100 lb/hr. In a conventional cyclone design, a cyclone separator receiving a flow rate of less than 100 lb/hr would require a dipleg of a ½" or less in diameter base on conventional solids flux criteria. Unfortunately, diplegs of this size are prone to jamming or catalyst bridging.

In an embodiment of the invention, the problem of having a cyclone stage with a small dipleg can be avoided by merging the output dipleg flows of two or more cyclone separator stages. This results in the output flows from two diplegs flowing through a common output conduit. In other words, the individual output conduits (diplegs) of two separators are joined together into a single merged output conduit. The output flows that originate in the two merging diplegs are therefore combined when they enter the single merged output conduit. The merged flows then flow through the common output conduit into a catalyst particle bed (such as a fluidized bed), or another location suitable for receiving the solids separated from the gas-solids flow. In an embodiment, by merging the dipleg output flows of a two cyclone stages, the dipleg diameter of both stages can be selected based on the cyclone stage with the higher expected dipleg output flow rate. In another embodiment, the diameter of the dipleg for the earlier cyclone stage is less than or equal to the diameter of the combined dipleg for the subsequent cyclone stage.

In various embodiments, any convenient dipleg geometry may be used to merge the flows. For example, one of the diplegs may be bent while the other is straight, or both diplegs may be inclined toward each other. At the location where the diplegs merge, the diplegs can be joined openly, using a valve, or by any other suitable method for joining conduits containing a flow of gas and solid catalyst particles.

In various embodiments, the diameter of each of the merged diplegs can be 0.15 feet or greater, or 0.33 feet or greater, or 0.5 feet or greater, or 1 foot or greater, or 1.5 feet or greater, or 2 feet or greater, or 2.5 feet or greater, or 3 feet or greater, or 3.5 feet or greater, or 4 feet or greater. Alternatively, the diameter can be 1 foot or less, or 1.5 feet or less, or 2 feet or less, or 2.5 feet or less, or 3 feet or less, or 3.5 feet or less, or 4 feet or less, or 4.5 feet or less, or 5 feet or less. In another embodiment, the diameter of each dipleg can be selected based on an expected solids flow rate through the dipleg having the higher solids flow rate. In an embodiment, the dipleg diameter is selected to so that the solid particle flux through the dipleg is from 25 $lb/ft^2*sec$ to 200 $lb/ft^2*sec$. Preferably, the dipleg diameter is selected to achieve a solid particle flux of from 50 $lb/ft^2*sec$ to 150 $lb/ft^2*sec$. In still another embodiment where the dipleg of an earlier cyclone stage is merged into the dipleg of a subsequent cyclone stage, the diameter of the dipleg of the subsequent cyclone stage is selected based on the combined expected solids flow rate generated by the earlier and subsequent cyclone stages. In yet another embodiment, the diplegs of two or more stages of the multi-stage cyclone separator are connected together. In still a further embodiment, the invention provides a cyclone separator having two or more stages where the dipleg of the next to last cyclone stage is connected to the dipleg or dust pot of the last cyclone stage.

In an embodiment having two or more cyclone stages, the input loading into an earlier cyclone stage is as much as 30 tons/min, or as much as 150 tons/min or greater, while the input loading into another subsequent downstream cyclone stage is 75 lbs/sec or less, or 50 lbs/sec or less, or 25 lbs/sec or less. In other embodiments, the input loading into a subsequent downstream cyclone stage can be even lower, such as 100 lbs/min or less, or 50 lbs/min or less, or 25 lbs/min or less. In still other embodiments, the input loading into a subsequent downstream cyclone stage can be still lower, such as 100 lbs/hr or less, or 50 lbs/hr or less, or 25 lbs/hr or less.

The dipleg of the earlier cyclone stage can be connected to or merged with the dipleg or dust pot of the subsequent cyclone stage by any of a variety of connection types. In an embodiment, a valve is included at the connection point between the diplegs of the earlier cyclone stage and the subsequent cyclone stage. The valve allows the dipleg of the earlier stage to be sealed off from the subsequent stage to reduce or eliminate flow back into the cyclone barrel of the later stage. In an embodiment, the valve can be a "flapper" type hinged valve. In such an embodiment, the valve flap opens based on force of the flow exiting the earlier dipleg. When the valve flap opens, the valve flap allows gas and solids from the earlier stage dipleg to enter the subsequent stage dipleg. However, this also will cause the valve flap to partially block the flow of gas and solids from the subsequent stage cyclone barrel down through the subsequent stage dipleg. To prevent the valve flap from completely blocking the flow of gas and solids from the subsequent stage cyclone barrel, the size of the valve flap should be less than the size of the subsequent dipleg.

In an alternative embodiment, an earlier and subsequent dipleg could be joined together without a valve. Such an embodiment may be useful, for example, when the merged dipleg extends below the surface of a catalyst particle bed. To avoid backflow into the barrel of the subsequent cyclone, the diplegs should be merged together far enough into the dipleg so that the dipleg will "seal" based on the flow from the second cyclone. During operation, a cyclone will typically have a pressure drop of between 1 and 2 psi between the entry and exit points for the flow. The "seal" in the dipleg should be sufficient to maintain this pressure differential, so that gas does not flow back through the dipleg and up into the cyclone. Note that because diplegs from two separate cyclone stages are being merged together, two seal conditions should be considered. Above the merge point for the two diplegs, the dipleg of the subsequent stage should be long enough to seal the subsequent stage dipleg relative to the earlier stage dipleg. Additionally, the merged dipleg flow should also seal the merged dipleg relative to the catalyst particle bed or other location that receives the output solid catalyst particles.

In an embodiment, the earlier stage dipleg should merge with the subsequent stage dipleg 3 or more feet below where the subsequent stage dipleg meets the subsequent stage cyclone cone. In another embodiment, the merge point should be 5 or more feet below, or 6 or more feet below, or 7 or more feet below where the subsequent stage dipleg meets the subsequent stage cyclone cone. In still another embodiment, the length of the merged dipleg should be at least 3 feet below the merge point, or at least 5 feet, or at least 6 feet, or at least 7 feet.

In still another alternative embodiment, non-conventional cyclones can also be used in this invention. Such cyclones include cyclonic separators having a variety of geometries, such as various conical or cylindrical geometries that are susceptible to use in creating a cyclone for separation by density. Such separators preferably cause separation by a mechanism similar to a centrifuge. A flow is introduced into the cyclone with sufficient velocity to set up a swirling flow pattern in the separator. As the flow travels through the cyclone separator, higher density components of the flow, such as solid particles, are driven to the barrel wall of the cyclone and are believed to flow under the influence of gravity and centrifugal force until the particles exit out the bottom. The lower density components, such as the gas phase components of a gas-solids flow, tend to be driven to the center of the barrel and exit through an outlet tube out the top of the device under the influence of a pressure field. In still another embodiment, other types of separators useful for gas-solids separation may also be configured and used according to the invention, so long as the separators are susceptible to having a reduced separation efficiency when the input gas-solids flow into the separator contains a low loading of solids.

Figure 2:
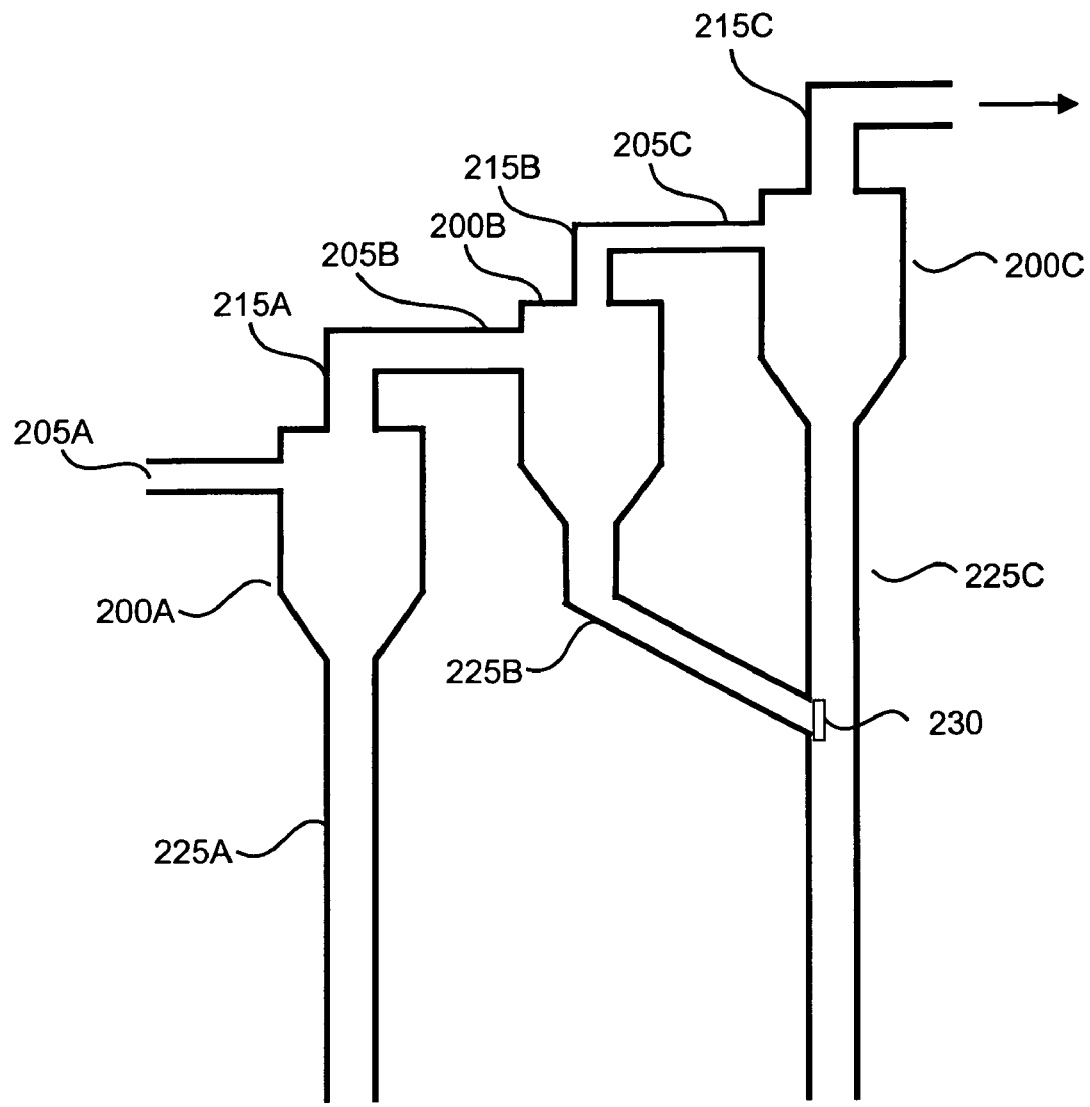
FIG. 2 depicts a schematic of a multi-stage cyclone separator according to an embodiment of the invention.

FIG. 2 schematically depicts a multi-stage cyclone containing three cyclone separator stages 200A-C according to an embodiment of the invention. As shown in FIG. 2, dipleg 225B is merged with dipleg 225C. At the location where dipleg 225B merges with dipleg 225C, an optional flapper valve 230 is shown.

In the embodiment shown in FIG. 2, during operation a gas-solids flow enters cyclone 200A at inlet 205A. The gas-solids flow is then separated into a first portion (having a higher solids content/higher density) and a second portion (having a higher gas content/lower density) by the cyclone separator 200A. The first portion exits the cyclone via dipleg 225A and is returned to the fluidized bed, dust pot, or another location for receiving catalyst particles. The second portion exits the cyclone via output conduit 215A and enters cyclone separator 200B via input conduit 205B. Note that the second portion that enters cyclone separator 200B via input conduit 205B is still a gas-solids flow, albeit with a lower solids loading than the initial gas-solids flow that entered cyclone separator 200A. Once again, the flow entering cyclone 200B is separated into a first portion (having a higher solids content/higher density) and a second portion (having a higher gas content/lower density) by the cyclone separator 200A. The lower density flow exiting cyclone 200B via output 215B flows into cyclone 200C through input conduit 205C. A third separation into a higher density and lower density flow takes place in cyclone 205C. The higher density flow exits cyclone 200C via dipleg 225C, where it is merged with the output flow from dipleg 225B. The lower density flow exiting cyclone 200C through output conduit 215C flows downstream in a reaction system for further processing or storage. Optionally, flapper valves (not shown) may also be placed on either or both bottom ends of diplegs 225A and 225C.

IV. Operation of a Multi-Stage Cyclone Within a Reaction System

Figure 3:
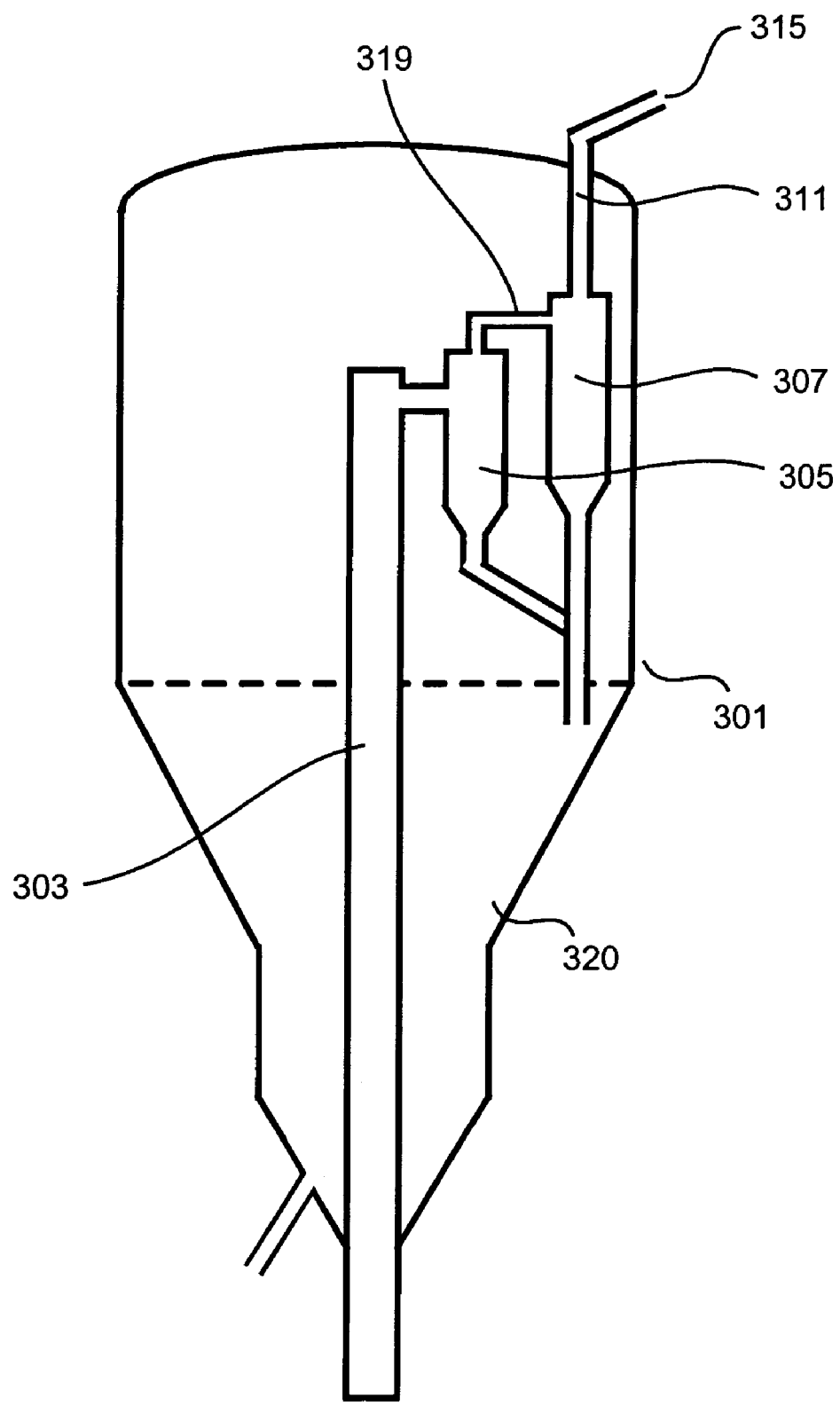
FIG. 3 depicts a simplified schematic of a reaction system incorporating a multi-stage cyclone separator according to an embodiment of the invention.

FIG. 3 depicts a simplified representation of a fluid catalytic cracking riser reactor that makes use of the claimed invention. In the embodiment shown in FIG. 3, only two cyclone separator stages are shown. In another embodiment, a 3 stage separator can be used, such as the separator shown in FIG. 2. In still other embodiments, any convenient number of separators can be used, so long as the separator stages are configured according to the invention.

In FIG. 3, a vessel 301 surrounds the upper terminal end of a riser 303 to which are attached a primary cyclone 305, and secondary cyclone 307. The primary cyclone 305 is attached to the riser 303 by means of an enclosed conduit. The primary cyclone 305 in turn is connected to the secondary cyclone 307 by means of a conduit 319. Overhead gas from the secondary cyclone 307 exits the reactor vessel 301 by means of an overhead conduit 311. The gases which exit the reactor through the overhead conduit 311 then leave the reactor through reactor overhead port 315. Catalyst particles recovered by the cyclones 305 and 307 drop through cyclone diplegs into catalyst bed 320, indicated here as the volume below the dotted line. Although only one series connection of cyclones 305 and 307 are shown, more than one series connection and/or more than two stages of cyclones in series could be used.

In the embodiment depicted in FIG. 3, the cyclones are close coupled to the riser and a vent slot, not shown, is placed in the conduit between the riser 303 and the first cyclone stage 305 to allow vapors from vessel 320 to exit. The vent slot may also be placed in either conduit 319 or conduit 311.

V. Types of Reaction Systems

The cyclone separators and separation processes of this invention are useful in any reaction system for performing reactions involving solid particles entrained in a gas-solids flow. Non-limiting examples of such reaction systems include reaction systems selected from the group consisting of catalytic cracking reaction systems, transalkylation reaction systems, isomerization reaction systems, catalytic dewaxing systems, alkylation reaction systems, hydrocracking reaction systems, systems for converting paraffins to olefins, systems for converting paraffins to aromatics, systems for converting olefins to gasoline, systems for converting olefins to distillate, systems for converting olefins to lubes, systems for converting alcohols to olefins, disproportionation reaction systems, systems for converting aromatics to higher aromatics, systems for adsorbing aromatics, systems for converting oxygenates (e.g., alcohols) to olefins, systems for converting oxygenates (e.g., alcohols) to aromatics or gasoline, systems for oligomerizing olefins, and systems for converting unsaturated hydrocarbons to aldehydes. More specifically, such examples include:

A) The catalytic cracking of a naphtha feed to produce light olefins. Typical reaction conditions include from about 500° C. to about 750° C., pressures of subatmospheric or atmospheric, generally ranging up to about 10 atmospheres (gauge) and residence time (time of contact of feed and/or product with catalyst) from about 10 milliseconds to about 10 seconds;

B) The catalytic cracking of high molecular weight hydrocarbons to lower weight hydrocarbons. Typical reaction conditions for catalytic cracking include temperatures of from about 400° C. to about 700° C., pressures of from about 0.1 atmosphere (bar) to about 30 atmospheres, and weight hourly space velocities of from about 0.1 $hr^{-1}$ to about 100 $hr^{-1}$;

C) The transalkylation of aromatic hydrocarbons in the presence of polyalkylaromatic hydrocarbons. Typical reaction conditions include a temperature of from about 200° C. to about 500° C., a pressure of from about atmospheric to about 200 atmospheres, a weight hourly space velocity of from about 1 $hr^{-1}$ to about 100 $hr^{-1}$, and an aromatic hydrocarbon/polyalkylaromatic hydrocarbon mole ratio of from about 1/1 to about 16/1;

D) The isomerization of aromatic (e.g., xylene) feedstock components. Typical reaction conditions for such include a temperature of from about 230° C. to about 510° C., a pressure of from about 0.5 atmospheres to about 50 atmospheres, a weight hourly space velocity of from about 0.1 $hr^{-1}$ to about 200 $hr^{-1}$, and a hydrogen/hydrocarbon mole ratio of from about 0 to about 100/1;

E) The catalytic dewaxing of hydrocarbons by selectively removing straight chain paraffins. The reaction conditions are dependent in large measure on the feed used and upon the desired pour point. Typical reaction conditions include a temperature between about 200° C. and 450° C., a pressure of up to 3,000 psig and a liquid hourly space velocity from 0.1 $hr^{-1}$ to 20 $hr^{-1}$.

F) The alkylation of aromatic hydrocarbons, e.g., benzene and alkylbenzenes, in the presence of an alkylating agent, e.g., olefins, formaldehyde, alkyl halides and alcohols having 1 to about 20 carbon atoms. Typical reaction conditions include a temperature of from about 100° C. to about 500° C., a pressure of from about atmospheric to about 200 atmospheres, a weight hourly space velocity of from about 1 $hr^{-1}$ to about 100 $hr^{-1}$, and an aromatic hydrocarbon/alkylating agent mole ratio of from about 1/1 to about 20/1;

G) The alkylation of aromatic hydrocarbons, e.g., benzene, with long chain olefins, e.g., $C_{14}$ olefin. Typical reaction conditions include a temperature of from about 50° C. to about 200° C., a pressure of from about atmospheric to about 200 atmospheres, a weight hourly space velocity of from about 2 $hr^{-1}$ to about 2000 $hr^{-1}$, and an aromatic hydrocarbon/olefin mole ratio of from about 1/1 to about 20/1. The resulting products from the reaction are long chain alkyl aromatics, which when subsequently sulfonated have particular application as synthetic detergents;

H) The alkylation of aromatic hydrocarbons with light olefins to provide short chain alkyl aromatic compounds, e.g., the alkylation of benzene with propylene to provide cumene. Typical reaction conditions include a temperature of from about 10° C. to about 200° C., a pressure of from about 1 to about 30 atmospheres, and an aromatic hydrocarbon weight hourly space velocity (WHSV) of from 1 $hr^{-1}$ to about 50 $hr^{-1}$;

I) The hydrocracking of heavy petroleum feedstocks, cyclic stocks, and other hydrocrack charge stocks. The catalyst will contain an effective amount of at least one hydrogenation component;

J) The alkylation of a reformate containing substantial quantities of benzene and toluene with fuel gas containing short chain olefins (e.g., ethylene and propylene) to produce mono- and dialkylates. Preferred reaction conditions include temperatures from about 100° C. to about 250° C., a pressure of from about 100 psig to about 800 psig, a WHSV-olefin from about 0.4 $hr^{-1}$ to about 0.8 $hr^{-1}$, a WHSV-reformate of from about 1 $hr^{-1}$ to about 2 $hr^{-1}$ and, optionally, a gas recycle from about 1.5 to about 2.5 vol/vol fuel gas feed;

K) The alkylation of aromatic hydrocarbons, e.g., benzene, toluene, xylene, and naphthalene, with long chain olefins, e.g., $C_{14}$ olefin, to produce alkylated aromatic lube base stocks. Typical reaction conditions include temperatures from about 100° C. to about 400° C. and pressures from about 50 psig to 450 psig;

L) The alkylation of phenols with olefins or equivalent alcohols to provide long chain alkyl phenols. Typical reaction conditions include temperatures from about 100° C. to about 250° C., pressures from about 1 to 300 psig and total WHSV of from about 2 $hr^{-1}$ to about 10 $hr^{-1}$;

M) The conversion of light paraffins to olefins and/or aromatics. Typical reaction conditions include temperatures from about 425° C. to about 760° C. and pressures from about 10 psig to about 2000 psig;

N) The conversion of light olefins to gasoline, distillate and lube range hydrocarbons. Typical reaction conditions include temperatures of from about 175° C. to about 375° C., and a pressure of from about 100 psig to about 2000 psig;

O) Two-stage hydrocracking for upgrading hydrocarbon streams having initial boiling points above about 200° C. to premium distillate and gasoline boiling range products or as feed to further fuels or chemicals processing steps. Either stage of the two-stage system can contain catalyst, which contains molecular sieve that is susceptible to loss of catalytic activity due to contact with water molecules. Typical reaction conditions include temperatures of from about 315° C. to about 455° C., pressures of from about 400 to about 2500 psig, hydrogen circulation of from about 1000 SCF/bbl to about 10,000 SCF/bbl and a liquid hourly space velocity (LHSV) of from about 0.1 $hr^{-1}$ to 10 $hr^{-1}$;

P) A combination hydrocracking/dewaxing process in the presence of a catalyst that contains molecular sieve that is susceptible to loss of catalytic activity due to contact with water molecules. The catalyst generally further comprises a hydrogenation component. Optionally included in the catalyst is zeolite molecular sieve such as zeolite Beta. Typical reaction conditions include temperatures from about 350° C. to about 400° C., pressures from about 1400 psig to about 1500 psig, LHSVs from about 0.4 $hr^{-1}$ to about 0.6 $hr^{-1}$ and a hydrogen circulation from about 3000 to about 5000 SCF/bbl;

Q) The reaction of alcohols with olefins to provide mixed ethers, e.g., the reaction of methanol with isobutene and/or isopentene to provide methyl-t-butyl ether (MTBE) and/or t-amyl methyl ether (TAME). Typical conversion conditions include temperatures from about 20° C. to about 200° C., pressures from 2 to about 200 atm, WHSV (gram-olefin per hour gram-zeolite) from about 0.1 hr$^{-1}$ to about 200 hr$^{-1}$ and an alcohol to olefin molar feed ratio from about 0.1/1 to about 5/1;

R) The disproportionation of aromatics, e.g., the disproportionation toluene to make benzene and paraxylene. Typical reaction conditions include a temperature of from about 200° C. to about 760° C., a pressure of from about atmospheric to about 60 atmosphere (bar), and a WHSV of from about 0.1 hr$^{-1}$ to about 30 hr$^{-1}$;

S) The conversion of naphtha (e.g., $C_6$-$C_{10}$) and similar mixtures to highly aromatic mixtures. Thus, normal and slightly branched chained hydrocarbons, preferably having a boiling range above about 40° C., and less than about 200° C., can be converted to products having a substantially higher octane aromatics content by contacting the hydrocarbon feed with a molecular sieve catalyst at a temperature of from about 400° C. to 600° C., preferably from about 480° C. to about 550° C., at pressures of from atmospheric to 40 bar, and liquid hourly space velocities (LHSV) of from 0.1 hr$^{-1}$ to 15 hr$^{-1}$;

T) The adsorption of alkyl aromatic compounds for the purpose of separating various isomers of the compounds;

U) The conversion of oxygenates, e.g., alcohols, such as methanol, or ethers, such as dimethylether, or mixtures thereof to hydrocarbons including olefins and aromatics with reaction conditions including temperatures of from about 275° C. to about 600° C., pressures of from about 0.5 atmosphere to about 50 atmospheres, and a liquid hourly space velocity of from about 0.1 hr$^{-1}$ to about 100 hr$^{-1}$;

V) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a molecular sieve catalyst at a temperature in the range of from about 250° C. to about 800° C., a LHSV of from about 0.2 hr$^{-1}$ to about 50 hr$^{-1}$, and a hydrocarbon partial pressure of from about 0.1 to about 50 atmospheres. Temperatures below about 250° C. may be used to oligomerize the feedstock when the feedstock is in the liquid phase when contacting the coated zeolite catalyst. Thus, when the olefin feedstock contacts the catalyst in the liquid phase, temperatures of from about 10° C. to about 250° C. may be used;

W) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

In general, reactor conditions include a temperature of from about 100° C. to about 760° C., a pressure of from about 0.1 atmosphere (bar) to about 200 atmospheres (bar), a weight hourly space velocity of from about 0.08 hr$^{-1}$ to about 2,000 hr$^{-1}$.

The separation processes of this invention are particularly suited to large, commercial scale reaction systems. For example, the separation processes of this invention are particularly suited to reaction systems that require a catalyst loading of at least about 1,000 kg of catalyst, based on total amount of catalyst located throughout the reaction system. In particular, the separation processes of this invention are particularly suited to reaction systems that require a catalyst loading of at least about 10,000 kg of catalyst, more particularly a catalyst loading of at least about 100,000 kg of catalyst, and most particularly a catalyst loading of at least about 250,000 kg of catalyst, based on total amount of catalyst located throughout the reaction system.

VI. Oxygenate to Olefin Reactions

An example of a reaction system that benefits from this invention is an oxygenate-to-olefin process. Conventionally, oxygenate-to-olefin processes are carried out in a fluidized bed, fast fluidized bed, or riser reactor configuration where a fluid (gas) flow of a feedstock is passed through a bed of solid catalyst particles. More generally, the processes of this invention are applicable to gas-solids reaction systems where the solids are separated from the gas flow at some point during the reaction process, including systems where the gas is inert. The examples below describe an oxygenate to olefin reaction system that can be improved using the separation process of the invention.

Oxygenates used in this invention include one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In another embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

In a conventional oxygenate to olefin reaction, a feed containing an oxygenate is contacted in a reaction zone of a reactor apparatus with a molecular sieve catalyst at process conditions effective to produce light olefins, i.e., an effective temperature, pressure, WHSV (weight hour space velocity) and, optionally, an effective amount of diluent, correlated to produce light olefins. Usually, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions. As used herein, the term reactor includes not only commercial scale reactors but also pilot sized reactor units and lab bench scale reactor units.

The conversion of oxygenates to produce light olefins may be carried out in a variety of large scale catalytic reactors, including, but not limited to, fluid bed reactors and concurrent riser reactors as described in Fluidization Engineering, D. Kunii and O. Levenspiel, Robert E. Krieger Publishing Co. NY, 1977, incorporated in its entirety herein by reference. Additionally, countercurrent free fall reactors may be used in the conversion process. See, for example, U.S. Pat. No. 4,068,136 and Fluidization and Fluid-Particle Systems, pages 48-59, F. A. Zenz and D. F. Othmer, Reinhold Publishing Corp., NY 1960, the descriptions of which are expressly incorporated herein by reference.

In one embodiment of this invention, the gas and solid particles are flowed through the gas-solids reactor system at a weight hourly space velocity (WHSV) of from about 1 $hr^{-1}$ to about 5,000 $hr^{-1}$, preferably from about 5 $hr^{-1}$ to about 3,000 $hr^{-1}$, more preferably from about 10 $hr^{-1}$ to about 1,500 $hr^{-1}$, and most preferably from about 20 $hr^{-1}$ to about 1,000 $hr^{-1}$. In one preferred embodiment, the WHSV is greater than 25 $hr^{-1}$, and up to about 500 $hr^{-1}$. In this invention, WHSV is defined as the total weight per hour of the gas flowing between reactor walls divided by the total weight of the solids flowing between the same segment of reactor walls. The WHSV is maintained at a level sufficient to keep the catalyst composition in a fluidized state within a reactor.

In another embodiment of the invention directed toward use of cyclones in conjunction with a riser reactor, the gas and solid particles are flowed through the gas-solids reactor system at a gas superficial velocity (GSV) at least 1 meter per second (m/sec), preferably greater than 2 m/sec, more preferably greater than 3 m/sec, and most preferably greater than 4 m/sec. The GSV should be sufficient to maintaining the solids in a fluidized state, particularly in a fast fluidized state.

In still another embodiment, cyclones configured according to this invention can be used with a fixed or fluidized bed reactor. In such an embodiment, the GSV can be as low as 0.03 m/s.

In yet another embodiment of the invention, the solids particles and gas are flowed through the gas-solids reactor at a solids to gas mass ratio of about 5:1 to about 75:1. Preferably, the solids particles and gas are flowed through the gas-solids reactor at a solids to gas mass ratio of about 8:1 to about 50:1, more preferably from about 10:1 to about 40:1.

In one practical embodiment, the process is conducted as a fluidized bed process or high velocity fluidized bed process utilizing a reactor system, a regeneration system and a recovery system. In such a process the reactor system conveniently includes a fluid bed reactor system having a first reaction region consisting of various fast fluid or dense fluid beds in series or parallel and a second reaction region within at least one disengaging vessel, comprising two or more cyclones configured and/or operated according to various embodiments of the invention. In one embodiment, the fast fluid or dense fluid beds and disengaging vessel are contained within a single reactor vessel. Fresh feedstock, preferably containing one or more oxygenates, optionally with one or more diluent(s), is fed to the one or more fast fluid or dense fluid beds reactor(s) into which a molecular sieve catalyst composition or coked version thereof is introduced. In one embodiment, prior to being introduced to the reactor(s), the molecular sieve catalyst composition or coked version thereof is contacted with a liquid and/or vapor, preferably water and methanol, and a gas, for example, an inert gas such as nitrogen.

In an embodiment, the amount of fresh feedstock fed as a liquid and/or a vapor to the reactor system is in the range of from 0.1 weight percent to about 99.9 weight percent, such as from about 1 weight percent to about 99 weight percent, more typically from about 5 weight percent to about 95 weight percent based on the total weight of the feedstock including any diluent contained therein. The liquid and vapor feedstocks may be the same composition, or may contain varying proportions of the same or different feedstocks with the same or different diluents.

The process of this invention can be conducted over a wide range of temperatures, such as in the range of from about 200° C. to about 1000° C., for example from about 250° C. to about 800° C., including from about 250° C. to about 750° C., conveniently from about 300° C. to about 650° C., typically from about 350° C. to about 600° C. and particularly from about 350° C. to about 550° C.

Similarly, the process of this invention can be conducted over a wide range of pressures including autogenous pressure. Typically the partial pressure of the feedstock exclusive of any diluent therein employed in the process is in the range of from about 0.1 kPaa to about 5 MPaa, such as from about 5 kpaa to about 1 MPaa, and conveniently from about 20 kPaa to about 500 kPaa.

In embodiments involving a riser reactor, the solids particles and gas are flowed through the gas-solids reactor at a solids to gas mass ratio of about 0.5:1 to about 75:1. Preferably, the solids particles and gas are flowed through the gas-solids reactor at a solids to gas mass ratio of about 8:1 to about 50:1, more preferably from about 10:1 to about 40:1.

During the conversion of a hydrocarbon feedstock, preferably a feedstock containing one or more oxygenates, the amount of olefin(s) produced based on the total weight of hydrocarbon produced is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

The feedstock entering the reactor system is preferably converted, partially or fully, in the first reactor region into a gaseous effluent that enters the disengaging vessel along with the coked catalyst composition. In an embodiment, the disengaging vessel includes cyclone separators configured and/or operated according to the invention. In another embodiment, the disengaging vessel also includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition that is then introduced to a regeneration system.

The coked catalyst composition is withdrawn from the disengaging vessel and introduced to the regeneration system. The regeneration system comprises a regenerator where the coked catalyst composition is contacted with a regeneration medium, preferably a gas containing oxygen, under conventional regeneration conditions of temperature, pressure and residence time. In an embodiment, a gas-solids flow exiting a regenerator may be passed through cyclones configured according to the invention.

Non-limiting examples of suitable regeneration media include one or more of oxygen, $O_3$, $SO_3$, $N_2O$, $NO$, $NO_2$, $N_2O_5$, air, air diluted with nitrogen or carbon dioxide, oxygen and water (U.S. Pat. No. 6,245,703), carbon monoxide and/or hydrogen. Suitable regeneration conditions are those capable of burning coke from the coked catalyst composition, preferably to a level less than 0.5 weight percent based on the total weight of the coked molecular sieve catalyst composition entering the regeneration system. For example, the regeneration temperature may be in the range of from about 200° C. to about 1500° C., such as from about 300° C. to about 1000° C., for example from about 450° C. to about 750° C., and conveniently from about 550° C. to 700° C. The regeneration pressure may be in the range of from about 15 psia (103 kpaa) to about 500 psia (3448 kpaa), such as from about 20 psia (138 kPaa) to about 250 psia (1724 kPaa), including from about 25 psia (172 kPaa) to about 150 psia (1034 kpaa), and conveniently from about 30 psia (207 kpaa) to about 60 psia (414 kPaa).

The residence time of the catalyst composition in the regenerator may be in the range of from about one minute to several hours, such as from about one minute to 100 minutes. The amount of oxygen in the regeneration flue gas (i.e., gas which leaves the regenerator) may be in the range of from about 0.01 mole percent to about 5 mole percent based on the total volume of the gas. The amount of oxygen in the gas used to regenerate the coked catalyst (i.e., fresh or feed gas) is typically at least about 15 mole percent, preferably at least about 20 mole percent, and more preferably from about 20 mole percent to about 30 mole percent, based on total amount of regeneration gas fed to the regenerator.

The burning of coke in the regeneration step is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system. Other methods for operating a regeneration system are in disclosed U.S. Pat. No. 6,290,916 (controlling moisture), which is herein fully incorporated by reference.

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the reactor(s). In one embodiment, the regenerated catalyst composition withdrawn from the regeneration system is returned to the reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more reactor(s).

By controlling the flow of the regenerated catalyst composition or cooled regenerated catalyst composition from the regeneration system to the reactor system, the optimum level of coke on the molecular sieve catalyst composition entering the reactor is maintained. There are many techniques for controlling the flow of a catalyst composition described in Michael Louge, Experimental Techniques, Circulating Fluidized Beds, Grace, Avidan and Knowlton, eds., Blackie, 1997 (336-337), which is herein incorporated by reference.

Coke levels on the catalyst composition are measured by withdrawing the catalyst composition from the conversion process and determining its carbon content. Typical levels of coke on the molecular sieve catalyst composition, after regeneration, are in the range of from 0.01 weight percent to about 15 weight percent, such as from about 0.1 weight percent to about 10 weight percent, for example from about 0.2 weight percent to about 5 weight percent, and conveniently from about 0.3 weight percent to about 2 weight percent based on the weight of the molecular sieve.

The gaseous reactor effluent is withdrawn from the disengaging system and is passed through a recovery system. There are many well known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a dethanizer, a depropanizer, a wash tower often referred to as a caustic wash tower and/or quench tower, absorbers, adsorbers, membranes, ethylene (C2) splitter, propylene (C3) splitter and butene (C4) splitter.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system. For example, the light olefin(s) produced particularly in a MTO process are passed through a purification system that removes low levels of by-products or contaminants.

Typically, in converting one or more oxygenates to olefin(s) having 2 or 3 carbon atoms, a minor amount hydrocarbons, particularly olefin(s), having 4 or more carbon atoms is also produced. The amount of $C_4+$ hydrocarbons is normally less than 20 weight percent, such as less than 10 weight percent, for example less than 5 weight percent, and particularly less than 2 weight percent, based on the total weight of the effluent gas withdrawn from the process, excluding water. Typically, therefore the recovery system may include one or more reaction systems for converting the $C_4+$ impurities to useful products.

VI. Description of Solid Particles

In an embodiment, the apparatus and method of the invention are generally useful for separating any solid particles in a gas-solids flow. In another embodiment, the solid particles can be catalyst particles, such as molecular sieve catalyst particles.

Molecular sieve catalyst particles for use in a gas-solids reaction can be synthesized by a variety of methods. In an embodiment, catalyst particles are synthesized by combining a first dried molecular sieve catalyst with water to make a water-catalyst composition, making a slurry from the water-catalyst composition, and drying the slurry to produce a second dried molecular sieve catalyst. The method particularly provides for the re-manufacturing, recycling or re-working of dried or substantially dried, or partially dried molecular sieve catalysts to yield catalyst particles with properties that are acceptable to the user or manufacturer. Such properties are usually observed after the dried molecular sieve catalyst is calcined. These properties include acceptable particle size, particle size distribution, particle density, and particle hardness.

The catalysts of this invention can include any of a variety of molecular sieve components. The components include zeolites or non-zeolites, preferably non-zeolites. In one embodiment, the molecular sieves are small pore non-zeolite molecular sieves having an average pore size of less than about 5 angstroms, preferably an average pore size ranging from about 3 to 5 angstroms, more preferably from 3.5 to 4.2 angstroms. These pore sizes are typical of molecular sieves having 8 membered rings.

Conventional crystalline aluminosilicate zeolites having catalytic activity are desirable molecular sieves that can be used in making the catalyst of this invention. Examples of such zeolite materials are described in U.S. Pat. Nos. 3,660,274 and 3,944,482, both of which are incorporated herein by reference. Non-limiting examples of zeolites which can be employed in the practice of this invention, include both natural and synthetic zeolites. These zeolites include zeolites of the structural types included in the *Atlas of Zeolite Framework Types*, edited by Ch. Baerlocher, W. M. Meier, D. H. Olson, Fifth Revised edition, Elsevier, Amsterdam, 2001, the descriptions of which are incorporated herein by reference.

Zeolites typically have silica-to-alumina ($SiO_2/Al_2O_3$) mole ratios of at least about 2, and have uniform pore diameters from about 3 to 15 Angstroms. They also generally contain alkali metal cations, such as sodium and/or potassium and/or alkaline earth metal cations, such as magnesium and/or calcium. In order to increase the catalytic activity of the zeolite, it may be desirable to decrease the alkali metal content of the crystalline zeolite to less than about 5 wt. %, preferably less than about 1 wt. %, and more preferably less than about 0.5 wt. %. The alkali metal content reduction, as is known in the art, may be conducted by exchange with one or more cations selected from the Groups IIB through VIII of the Periodic Table of Elements (the Periodic Table of Elements referred to herein is given in *Handbook of Chemistry and Physics*, published by the Chemical Rubber Publishing Company, Cleveland, Ohio, 45th Edition, 1964 or 73rd Edition, 1992), as well as with hydronium ions or basic adducts of hydronium ions, e.g., $NH_4^+$, capable of conversion to a hydrogen cation upon calcination. Desired cations include rare earth cations, calcium, magnesium, hydrogen and mixtures thereof. Ion-exchange methods are well known in the art and are described, for example, in U.S. Pat. Nos. 3,140,249; 3,142,251 and 1,423,353, the teachings of which are hereby incorporated by reference.

In another embodiment, the catalyst particles which are flowed through the gas-solids reactor system of this invention are molecular sieve catalysts, such as a conventional molecular sieve. Examples include zeolite as well as non-zeolite molecular sieves, and are of the large, medium or small pore type. Non-limiting examples of these molecular sieves are the small pore molecular sieves, AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted forms thereof; the medium pore molecular sieves, AFO, AEL, EUO, HEU, FER, MEL, MFI, MTW, MTT, TON, and substituted forms thereof; and the large pore molecular sieves, EMT, FAU, and substituted forms thereof. Other molecular sieves include ANA, BEA, CFI, CLO, DON, GIS, LTL, MER, MOR, MWW and SOD. Non-limiting examples of the preferred molecular sieves, particularly for converting an oxygenate containing feedstock into olefin(s), include AEL, AFY, BEA, CHA, EDI, FAU, FER, GIS, LTA, LTL, MER, MFI, MOR, MTT, MWW, TAM and TON. In one preferred embodiment, the molecular sieve of the invention has an AEI topology or a CHA topology, or a combination thereof, most preferably a CHA topology.

Molecular sieve materials all have 3-dimensional, four-connected framework structure of corner-sharing $TO_4$ tetrahedra, where T is any tetrahedrally coordinated cation. These molecular sieves are typically described in terms of the size of the ring that defines a pore, where the size is based on the number of T atoms in the ring. Other framework-type characteristics include the arrangement of rings that form a cage, and when present, the dimension of channels, and the spaces between the cages. See van Bekkum, et al., *Introduction to Zeolite Science and Practice*, Second Completely Revised and Expanded Edition, Volume 137, pages 1-67, Elsevier Science, B.V., Amsterdam, Netherlands (2001).

Molecular sieves, particularly zeolitic and zeolitic-type molecular sieves, preferably have a molecular framework of one, preferably two or more corner-sharing $[TO_4]$ tetrahedral units, more preferably, two or more $[SiO_4]$, $[AlO_4]$ and/or $[PO_4]$ tetrahedral units, and most preferably $[SiO_4]$, $[AlO_4]$ and $[PO_4]$ tetrahedral units. These silicon, aluminum, and phosphorous based molecular sieves and metal containing silicon, aluminum and phosphorous based molecular sieves have been described in detail in numerous publications including for example, U.S. Pat. No. 4,567,029 (MeAPO where Me is Mg, Mn, Zn, or Co), U.S. Pat. No. 4,440,871 (SAPO), European Patent Application EP-A-0 159 624 (ELAPSO where El is As, Be, B, Cr, Co, Ga, Ge, Fe, Li, Mg, Mn, Ti or Zn), U.S. Pat. No. 4,554,143 (FeAPO), U.S. Pat. Nos. 4,822,478, 4,683,217, 4,744,885 (FeAPSO), EP-A-0 158 975 and U.S. Pat. No. 4,935,216 (ZNAPSO, EP-A-0 161 489 (CoAPSO), EP-A-0 158 976 (ELAPO, where EL is Co, Fe, Mg, Mn, Ti or Zn), U.S. Pat. No. 4,310,440 ($AlPO_4$), EP-A-0 158 350 (SENAPSO), U.S. Pat. No. 4,973,460 (LiAPSO), U.S. Pat. No. 4,789,535 (LiAPO), U.S. Pat. No. 4,992,250 (GeAPSO), U.S. Pat. No. 4,888,167 (GeAPO), U.S. Pat. No. 5,057,295 (BAPSO), U.S. Pat. No. 4,738,837 (CrAPSO), U.S. Pat. Nos. 4,759,919, and 4,851,106 (CrAPO), U.S. Pat. Nos. 4,758,419, 4,882,038, 5,434, 326 and 5,478,787 (MgAPSO), U.S. Pat. No. 4,554,143 (FeAPO), U.S. Pat. No. 4,894,213 (AsAPSO), U.S. Pat. No. 4,913,888 (AsAPO), U.S. Pat. Nos. 4,686,092, 4,846,956 and 4,793,833 (MnAPSO), U.S. Pat. Nos. 5,345,011 and 6,156,931 (MnAPO), U.S. Pat. No. 4,737,353 (BeAPSO), U.S. Pat. No. 4,940,570 (BeAPO), U.S. Pat. Nos. 4,801,309, 4,684,617 and 4,880,520 (TiAPSO), U.S. Pat. Nos. 4,500, 651, 4,551,236 and 4,605,492 (TiAPO), U.S. Pat. Nos. 4,824,554, 4,744,970 (CoAPSO), U.S. Pat. No. 4,735,806 (GaAPSO) EP-A-0 293 937 (QAPSO, where Q is framework oxide unit [$QO_2$]), as well as U.S. Pat. Nos. 4,567,029, 4,686,093, 4,781,814, 4,793,984, 4,801,364, 4,853,197, 4,917,876, 4,952,384, 4,956,164, 4,956,165, 4,973,785, 5,241,093, 5,493,066 and 5,675,050, all of which are herein fully incorporated by reference.

Other molecular sieves include those described in EP-0 888 187 B1 (microporous crystalline metallophosphates, $SAPO_4$ (UIO-6)), U.S. Pat. No. 6,004,898 (molecular sieve and an alkaline earth metal), U.S. Pat. No. 6,743,747 (integrated hydrocarbon co-catalyst), PCT WO 01/64340 published Sep. 7, 2001 (thorium containing molecular sieve), and R. Szostak, *Handbook of Molecular Sieves*, Van Nostrand Reinhold, New York, N.Y. (1992), which are all herein fully incorporated by reference.

The more preferred silicon, aluminum and/or phosphorous containing molecular sieves, and aluminum, phosphorous, and optionally silicon, containing molecular sieves include aluminophosphate (ALPO) molecular sieves and silicoaluminophosphate (SAPO) molecular sieves and substituted, preferably metal substituted, ALPO and SAPO molecular sieves. The most preferred molecular sieves are SAPO molecular sieves, and metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as [$MeO_2$], and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the molecular sieve, as described in many of the U.S. Patents mentioned above, is represented by the empirical formula, on an anhydrous basis:

$$mR:(M_xAl_yP_z)O_2$$

wherein R represents at least one templating agent, preferably an organic templating agent; m is the number of moles of R per mole of $(M_xAl_yP_z)O_2$ and m has a value from 0 to 1, preferably 0 to 0.5, and most preferably from 0 to 0.3; x, y, and z represent the mole fraction of Al, P and M as tetrahedral oxides, where M is a metal selected from one of Group IA, IIA, IB, IIIB, IVB, VB, VIIB, VIIB, VIIIB and Lanthanide's of the Periodic Table of Elements, preferably M is selected from one of the group consisting of Co, Cr, Cu, Fe, Ga, Ge, Mg, Mn, Ni, Sn, Ti, Zn and Zr. In an embodiment, m is greater than or equal to 0.2, and x, y and z are greater than or equal to 0.01.

In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

Non-limiting examples of SAPO and ALPO molecular sieves used in the invention include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44 (U.S. Pat. No. 6,162,415), SAPO-47, SAPO-56, ALPO-5, ALPO-11, ALPO-18, ALPO-31, ALPO-34, ALPO-36, ALPO-37, ALPO-46, and metal containing molecular sieves thereof. The more preferred zeolite-type molecular sieves include one or a combination of SAPO-18, SAPO-34, SAPO-35, SAPO-44, SAPO-56, ALPO-18 and ALPO-34, even more preferably one or a combination of SAPO-18, SAPO-34, ALPO-34 and ALPO-18, and metal containing molecular sieves thereof, and most preferably one or a combination of SAPO-34 and ALPO-18, and metal containing molecular sieves thereof.

In an embodiment, the molecular sieve is an intergrowth material having two or more distinct phases of crystalline structures within one molecular sieve composition. In particular, intergrowth molecular sieves are described in the U.S. Patent Publication No. 2002/0165089 and PCT WO 98/15496, both of which are herein fully incorporated by reference. In another embodiment, the molecular sieve comprises at least one intergrown phase of AEI and CHA framework-types. For example, SAPO-18, ALPO-18 and RUW-18 have an AEI framework-type, and SAPO-34 has a CHA framework-type. In still another embodiment, the molecular sieves used in the invention are combined with one or more other molecular sieves.

The molecular sieves are made or formulated into catalysts by combining the synthesized molecular sieves with a binder and/or a matrix material to form a molecular sieve catalyst composition or a formulated molecular sieve catalyst composition. This formulated molecular sieve catalyst composition is formed into useful shape and sized particles by conventional techniques such as spray drying, pelletizing, extrusion, and the like.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are desired. Particularly desired are metallocene, Ziegler/Natta and acid catalytic systems. See, for example, U.S. Pat. Nos. 3,258,455; 3,305,538; 3,364, 190; 5,892,079; 4,659,685; 4,076,698; 3,645,992; 4,302, 565; and 4,243,691, the catalyst and process descriptions of each being expressly incorporated herein by reference. In general, these methods involve contacting the olefin product with a polyolefin-forming catalyst at a pressure and temperature effective to form the polyolefin product.

Persons of ordinary skill in the art will recognize that many modifications may be made to the present invention without departing from the spirit and scope of the present invention. The embodiments described herein are meant to be illustrative only and should not be taken as limiting the invention, which is defined by the following claims.

We claim:

1. A method for separating solids from a gas-solids flow in a cyclone separator having at least two stages, comprising:

separating a gas-solids flow into a first flow portion and a second flow portion in a first stage of the cyclone separator, the first flow portion having a higher density than the second flow portion;

feeding the second flow portion into a second stage of the cyclone separator;

separating the second flow portion into a third flow portion and fourth flow portion, the third flow portion having a higher density than the fourth flow portion;

merging the first flow portion with the third flow portion by merging output diplegs from each of the first and second stages through a common output conduit;

flowing the merged flow portions through the common output conduit into a location for receiving solids separated from the gas-solids flow, wherein flow through the output diplegs from each of the first and second stages is at a solid particle flux to prevent gas from flowing back into the cyclone separator.

2. The method of claim 1, wherein the location for receiving solids separated from the gas-solids flow is a fluidized bed.

3. The method of claim 1, wherein the solid particle loading in the second flow portion is 75 lb/sec or less.

4. The method of claim 1, wherein the solid particle loading in the second flow portion is 50 lb/sec or less.

5. The method of claim 1, wherein the solid particle loading in the second flow portion is 25 lb/sec or less.

6. The method of claim 1, wherein the solid particle loading in the second flow portion is 100 lb/min or less.

7. The method of claim 1, wherein the solid particle loading in the second flow portion is 100 lb/hr or less.

8. The method of claim 1, wherein a solid particle flux of the third flow portion, prior to merging with the first flow portion, is 100 lb/ft$^2$*sec or less.

9. The method of claim 1, wherein a solid particle flux of the third flow portion, prior to merging with the first flow portion, is 50 lb/ft$^2$*sec or less.

10. The method of claim 1, wherein a solid particle flux of the third flow portion, prior to merging with the first flow portion, is 25 lb/ft$^2$*sec or less.

11. The method of claim 1, wherein the particle flux is at least 25 lbft$^2$*sec.

12. The method of claim 1, wherein the particle flux is from 25 lbft$^2$*sec to 200 lbft$^2$*sec.

* * * * *